April 1, 1941.   F. S. WHEELER   2,236,615
WIND DEFLECTOR
Filed May 22, 1939
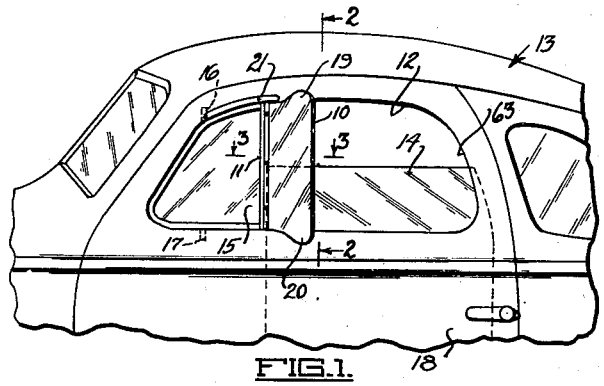
FIG.1.
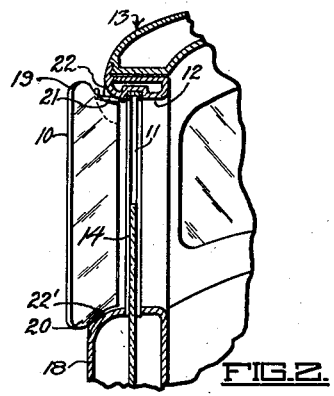
FIG.2.
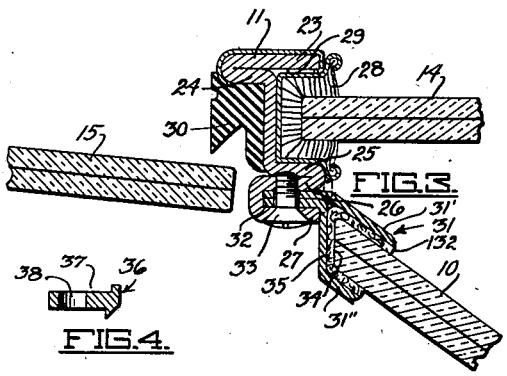
FIG.3.
FIG.4.
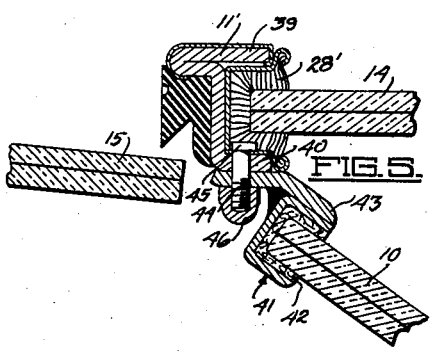
FIG.5.
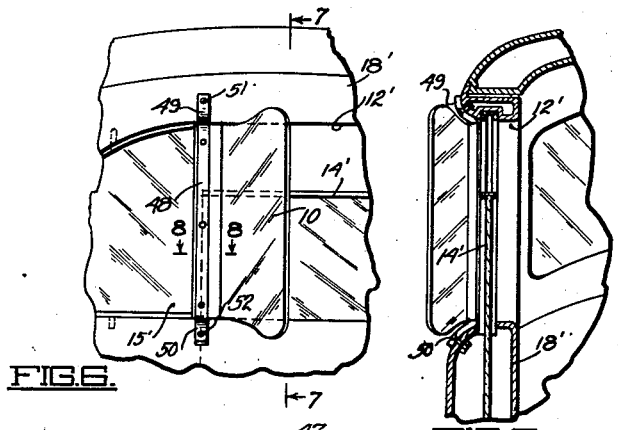
FIG.6.
FIG.8.
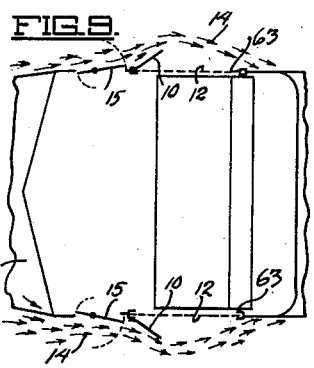
FIG.7.
FIG.9.
FIG.10.
INVENTOR
FRANK S. WHEELER
BY
W. E. Beatty
ATTORNEY Patented Apr. 1, 1941

2,236,615

UNITED STATES PATENT OFFICE 2,236,615

WIND DEFLECTOR

Frank S. Wheeler, Hollywood, Calif.

Application May 22, 1939, Serial No. 274,868

12 Claims. (Cl. 296—84)

This invention relates to a wind deflector and has particular reference to means for deflecting air currents away from an open window of an automobile, or the like, when in motion.

Many automobiles in common use at present employ front doors each having a main window movable up and down and a ventilator window movable about a vertical axis so as to deflect or otherwise cause air to be circulated through the automobile. These ventilator windows when properly adjusted and when the main windows are closed, enable the interior of the car to be ventilated without causing undue or uncomfortable drafts or currents of air. However, when the main windows are open, as required by law in some states, and as advisable in any event for permitting the arm to protrude through the window opening for signaling purposes, an undue amount of draft takes place through the main windows due to the forward motion of the automobile.

One object of the present invention is to reduce drafts or undue air currents through the open main window in the side door of a vehicle.

Another object is to enable ventilation of an automobile while preventing drafts therethrough.

A further object of the invention is to make use of the sealing post intermediate the main and ventilator windows in the side door of an automobile, for the purpose of supporting an air deflector.

The manner in which the above and other objects of the invention are accomplished will be readily understood on reference to the following specification read in conjunction with the accompanying drawing wherein:

Fig. 1 is a side view with parts broken away of an automobile and air deflector attached thereto embodying my present invention.

Fig. 2 is a transverse sectional view through the automobile and is taken along the line 2—2 of Fig. 1.

Fig. 3 is a sectional plan view of a preferred form of post assembly in accordance with my invention and is taken along the line 3—3 of Fig. 1.

Fig. 4 is a transverse sectional view through an ornamental tongue member or fillet adapted to be applied to the post assembly shown in Fig. 3 when the air deflector is not attached thereto.

Fig. 5 is an alternative form of attachment for an air deflector.

Fig. 6 is a fragmentary side view of an automobile employing an alternative form of mounting for an air deflector.

Fig. 7 is a transverse sectional view taken along the line 7—7 of Fig. 6.

Fig. 8 is a sectional plan view of the post and deflector assembly shown in Fig. 6 and is taken along the line 8—8 of that figure.

Fig. 9 is a diagrammatic plan view illustrating the deflection of air currents past an automobile when employing air deflectors in accordance with my present invention.

Fig. 10 is a diagrammatic plan view, similar to that of Fig. 9 illustrating the deflection of air currents when using a modified form of air deflector in accordance with my invention.

As shown in Figs. 1 and 2, the deflector 10 is shown as being attached to a stationary guiding and weather sealing post 11 constructed in accordance with the present invention and extending across the window opening 12 of an automobile 13. The usual main window 14 is movable up and down in the opening 12 to the rear of the post 11. The usual ventilator window 15 is provided in the opening 12 in front of the post 11 and is movable about co-axial pivots 16 and 17. The deflector 10 is formed of transparent window material, such as laminated safety glass, and extends rearwardly and outwardly from the window opening at an angle of approximately 35° with the plane of the window 14. Although the width of deflector 10 from the forward to the rear edge thereof may be varied as desired, I have found that a width of approximately five inches is satisfactory for most types of automobiles.

The deflector 10 has extensions 19 and 20 at the upper and lower ends thereof, respectively, which extensions extend above and below the upper and lower edges, respectively, of the window opening 12. The contour of extension 19 is so formed as to fit under a rain guard 21 secured to the door 18 of automobile 13 above the ventilator window 15. The extension 19 thus serves the purpose of increasing the deflection of both wind and rain away from the window opening 12. The remainder of the contour of the extension 19 is so formed that it somewhat follows the curved contour of the upper sill or edge surface 22 (Fig. 2) of the door and, further, forms a rounded corner which conforms to the various rounded corners of the automobile, thereby to present a pleasing appearance. The extension 20 is likewise rounded and is preferably of the same contour as the extension 19 allowing the deflector to be changed end for end on the right or left post 11. The contour of extension 20 also follows the curved contour of the adjacent sill surface 22' of door 18. Due to the extensions 19 and 20 projecting above and below the upper and lower sill edges of the window opening 12 as well as to the way in which the contour of these extensions 19 and 20 closely follow the adjacent surfaces 22 and 22' of the door 18 any tendency for a draft of air over or under the deflector 10 and into the window opening 12 therebehind will be materially reduced.

Fig. 3 illustrates a preferred form of post construction, formed in accordance with my invention, for supporting the deflector 10 with the forward edge thereof adjacent the forward edge of the main window 14. Post 11 comprises a single sheet of metal having an inner portion 23 forming one leg of a window guiding and sealing channel 29 and having another portion 24 thereof bent back on portion 23 and thence extending at right angles thereto to form the bottom of the channel. A portion of the remainder of the metal sheet is bent parallel to the portion 23 at 25 to form the other leg of the channel 29. A portion 26 is bent back upon portion or leg 25 to form one leg of a second channel. The remainder of the sheet is bent U-shaped to form the second leg 27 of the second channel which extends parallel to the first channel 29. A sealing strip 28 of mohair, or the like fabric, is secured to the inner surface of the main channel 29 and forms a weather seal for the forward edge of the main window 14 as well as to guide this window up and down and prevent rattle, as is well known. A soft rubber strip 30 is secured to the back portion of the post 11 so as to form a weather seal for the ventilator window 15 when this ventilator window is closed.

The deflector 10 is secured in the channel of a channel member 31, there being a binding strip 132 therebetween to secure the deflector 10 within the channel formed in member 31. It will be noted that member 31 is formed of two sheets 31' and 31'', one of which forms one side of the channel member 31 and the other of which forms the other side. Both sheets are secured together, as by welding, at the forward ends thereof to form a tongue 32 slidably fitted in the second and smaller channel formed in the post 11. One of a series of screws 33 provided along post 11 is shown as being passed through co-extensive apertures in the outer leg 27 and in the tongue 32, and is threaded in the leg 26 and part of leg 25 of post 11 to secure the deflector assembly to the post. It will be noted that the deflector 10 is bevelled at its forward edge 34 and that the channel member 31 is correspondingly formed so as to present an edge 35 perpendicular to the leg 27 of post 11. This construction enables unobstructed use of a screw driver or similar tool for inserting or removing the screws 33.

Since both ends of the deflector assembly including deflector 10 and channel member 31 are of the same shape, all deflector assemblies may be identical with each other and used interchangeably on either side of the automobile.

Should it be desirable to remove the deflector assembly, as in hot weather, or in shipping a car, a fillet member 36 (Fig. 4) having a tongue 37 of the same dimensions as tongue 32 may be replaced in the channel previously occupied by the tongue 32 of the deflector assembly so as to present a pleasing appearance to the post assembly. Fillet member 36 has a series of apertures one of which is shown at 38, corresponding in position to the apertures formed in the tongue 32 whereby the screws 33 may be used to secure the fillet member 36 to the post 11.

Fig. 5 illustrates an alternative form of attachment for the deflector 10. In this case, the deflector 10 is attached to the usual window post 11', which is in common use in existing automobiles at the present time. Post 11' is formed of a single sheet to present a channel having legs 39 and 40. A sealing strip 28' is formed in the channel provided by the post 11' to seal and guide the forward edge of the window 14. In this case, the forward edge of the deflector 10 is received in a channel member 41, there being a binding strip 42 therebetween to secure the deflector 10 in the channel member 41. Member 41 is secured to a base strip 43 which extends along the post 11' between the top and bottom of the window opening in any suitable manner, as by welding. Strip 43 is bent at the forward portion thereof to fit against the outer face of leg 40 of post 11'. One of a series of bolts 44 is passed through apertures formed in the post 40 and the strip 43 and has a head 45 thereon which rests against the inner surface of the leg 40. A nut 46 is secured on the threaded end of the bolt 44 to removably clamp the strip 43, and consequently, the deflector assembly to the post 11'.

Figs. 6, 7 and 8 show an alternative form of deflector assembly embodied in my present invention for an alternative form of existing window construction. In this type of construction, a main window 14' and a ventilator window 15' similar to those shown in Figs. 1 and 2 are provided in the same relative position. However, a sealing post 47 representative of the type in common use at present and forming a sealing member between the window 14' and ventilator window 15' is secured to the forward edge of the main window 14' and is movable up and down therewith. In this case, a separate vertical post 48 in accordance with my invention is provided to support the deflector 10. Post 48 extends closely adjacent the outer surface of post 47 and has curved extensions 49 and 50 (Fig. 7) at the top and bottom thereof which fit against the top and bottom sill edges of the window opening 12' of the door 18'. Bolts 51 and 52 are provided to secure these upper and lower extensions 49 and 50 to the upper and lower window sill formations on the door 18'. A channel 53 is formed in the post 48 to receive a tongue 54 of a channel member 55 similar to that of 32 (Fig. 3). One of a series of screws 56 is shown as extending through apertures formed in the outer leg of the post 48 and the tongue 54 and is threadably secured in the inner leg of post 48 to removably secure the deflector assembly to this post. A sealing flap 57 of rubber, or similar flexible material, is suitably cemented or otherwise secured along the inner edge of the post 48, the free edge 58 of which resiliently urges against the rear edge of the ventilator window 15' to form a weather seal between the ventilator window 15' and the post 48. It will be noted that the sealing member 57 or post 48 does not obstruct the movement of the window 14' and its post 47.

A further feature of the invention resides in the construction of the channel member 55 (Fig. 8) to present a more finished and pleasing appearance for the connection between this member and the transparent deflector 10. The binding strip 60 of flexible material, similar to that of 132 in Fig. 3 and 42 in Fig. 5 extending between the forward surfaces of the deflector 10 and the inner surfaces of the channel formed in member 55, has the edges 61 thereof terminating a shorter distance from the bottom of the channel in member 55 than the adjacent legs of the member 55. The end portions, as at 62, of the adjacent legs of member 55, extending beyond the edges 61 of the binding strip 60, are bent inwardly until they touch the adjacent surfaces of the deflector 10. This construction hides the edges of the binding strip 60 and forms a neat connection between the deflector 10 and channel member 55.

The operation and advantages of the deflector 10 will be readily understood on reference to the diagrammatic view of Fig. 9. Due to the forward motion of the automobile 13, relatively moving air currents as indicated by the arrows 14 flow rearwardly along the sides of the automobile 13. On striking the deflector 10 these air currents are deflected outwardly away from the window opening 12. By so arranging the angle and width of the deflector 10, these various air currents will be deflected a sufficient amount to prevent them from being again directed inwardly toward the opening 12 until the rear edge 63 has travelled in advance of these returning air currents.

It will be noted that the deflector 10 does not materially affect the operation of the ventilator window 15. Thus, the ventilator window 15 may be employed as usual to deflect or otherwise direct any desired amount of air currents into the automobile for ventilation or otherwise.

Fig. 10 illustrates an additional feature of my invention wherein the deflector 10' is curved outwardly away from the plane of the window opening 12 as at 64 to further increase the outward deflection of the air currents 14' away from the window opening 12. Due to this increased outward deflection of the air currents, the deflector 10' may be made narrower than is usually necessary while still obtaining the desired amount of deflection away from the window opening 12. In lieu of glass, transparent plastic material which may be easily molded, may be used for the deflector 10 to facilitate shaping the same.

It should be understood that although my invention has been described in connection with and is particularly applicable to automobiles, it is not meant to be restricted to use therewith but may be applied to trains, airplanes, etc.

I claim:

1. Means for controlling air currents through the side window opening of a vehicle having a main window movable up and down in said opening, a ventilator window in said opening in advance of said main window and movable outwardly to open the same and a window post between said windows, which comprises a deflector, and means positioning said deflector adjacent said opening with the forward edge thereof positioned adjacent and laterally removed from said post and the forward edge of the main window portion of said opening, said deflector extending rearwardly to deflect air away from said main window.

2. Means for controlling air currents through the window opening in the side door of a vehicle having a main window movable up and down and a ventilator window in advance of said main window and movable outwardly to open the same, which comprises a substantially vertical stationary post intermediate said main window and said ventilator window, an air deflector terminating in a flange, and means for removably securing said flange to said post, said deflector extending rearwardly and outwardly from said post.

3. In a vehicle having a side window opening, a window movable up and down in said opening, an air deflector terminating in a flange, an elongated U-shaped channel member outside the plane of movement of said window, and means removably securing said flange in said channel member.

4. Means for controlling air currents through the side window opening on a vehicle having a window movable up and down in said opening and a ventilator in said opening in advance of said window and movable to open the same which comprises a substantially vertical post, said post having a channel therein for guiding the forward edge of said window, and having a second channel therein parallel to said first mentioned channel, an air deflector, means on said deflector forming a tongue adapted to be fitted in said second channel, and means for securing said tongue in said channel.

5. An assembly adapted to be positioned in the side window opening of a vehicle to form a seal between a window and a juxtaposed ventilator in said opening which comprises a sheet having a portion thereof substantially U-shaped to form a channel for guiding one edge of said window and having another portion also substantiatlly U-shaped to form a second elongated channel parallel to said first mentioned channel, a tongue substantially as long as the height of said window, and means for securing said tongue in said second channel.

6. An assembly adapted to be positioned in the side window opening of a vehicle to form a seal between a window and a juxtaposed ventilator in said opening which comprises a sheet having a portion thereof substantially U-shaped to form a channel for guiding one edge of said window and having another integral portion thereof bent back on one of the legs of said U-shaped channel and forming the leg of a second elongated channel, means forming a tongue removably fitted in said second channel, and spaced means passing through the sides of said second channel for securing said tongue in said second channel.

7. Means for controlling air currents through the side window opening of a vehicle having a window movable up and down in said opening, a ventilator in said opening in advance of said window and movable to open the same and a post intermediate said window and said ventilator which comprises, means on said post forming a vertically extending channel, an elongated tongue member removably fitted in said channel, means on said tongue forming a second channel, an air deflector, and spaced means removably securing said tongue in said second channel, said second channel forming an angle with said tongue.

8. A transparent pane assembly comprising a U-shaped channel member, a flexible binding strip lining the inner walls of said channel to form a pane receiving channel and terminating a shorter distance from the bottom of said first mentioned channel than the legs of said first mentioned channel and a transparent pane fitted within said second mentioned channel, the end portions of the legs of said channel member extending beyond said binding strip being bent inward to substantially touch the opposite surfaces of said pane.

9. A transparent pane assembly comprising a U-shaped channel member, a flexible binding strip lining the inner walls of said channel to form a second channel, at least one of the legs of said second channel terminating a shorter distance from the bottom of said first mentioned channel than the adjacent leg of said channel member and a transparent pane fitted within said second channel, the end portions of said channel member leg extending beyond the adjacent leg of said binding strip being bent inward to substantiatlly touch the adjacent surface of said pane.

10. A post assembly adapted to be positioned in the side window opening of a vehicle to form a seal between a window and a juxtaposed ventilator in said opening in advance of said window which comprises a sheet having a portion thereof substantially U-shaped to form a channel for guiding one edge of said window and having another integral portion thereof bent back on one of the legs of said U-shaped channel and forming the leg of a second elongated channel substantially as long as the height of said window, said second channel extending parallel to said first mentioned channel and opening into the same side of said post assembly as said first mentioned channel to receive a tongue.

11. A post assembly according to claim 10 which comprises an air deflector, means adjacent one end of said deflector forming a tongue, and means for removably securing said tongue in said second channel.

12. A post assembly according to claim 10 comprising a fillet member substantially as long as said second channel, means on said member forming a tongue, and means for securing said tongue in said second channel.

FRANK S. WHEELER.